(12) United States Patent
Islam et al.

(10) Patent No.: US 11,595,998 B2
(45) Date of Patent: Feb. 28, 2023

(54) SEPARATION OF SYNCHRONIZATION SIGNAL BLOCKS FOR ACCESS AND BACKHAUL RANDOM ACCESS CHANNEL TRANSMISSIONS

(71) Applicant: QUALCOMM Incorporated, San Diego, CA (US)

(72) Inventors: Muhammad Nazmul Islam, Littleton, MA (US); Tao Luo, San Diego, CA (US); Navid Abedini, Somerset, NJ (US); Junyi Li, Chester, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 16/540,712

(22) Filed: Aug. 14, 2019

(65) Prior Publication Data
US 2020/0059970 A1    Feb. 20, 2020

Related U.S. Application Data

(60) Provisional application No. 62/764,991, filed on Aug. 20, 2018.

(51) Int. Cl.
*H04W 74/08* (2009.01)
*H04W 76/27* (2018.01)
(Continued)

(52) U.S. Cl.
CPC ..... *H04W 74/0833* (2013.01); *H04W 56/001* (2013.01); *H04W 76/27* (2018.02); *H04W 80/02* (2013.01)

(58) Field of Classification Search
CPC .......... H04W 74/0833; H04W 56/001; H04W 76/27; H04W 80/02; H04W 56/0015;
(Continued)

(56) References Cited

U.S. PATENT DOCUMENTS

2018/0092139 A1 * 3/2018 Novlan ............... H04B 7/2606
2018/0324678 A1 * 11/2018 Chen .................... H04W 48/16
(Continued)

FOREIGN PATENT DOCUMENTS

WO    WO-2020029868 A1 *  2/2020   ........... H04B 7/0626

OTHER PUBLICATIONS

International Search Report and Written Opinion—PCT/US2019/046664—ISA/EPO—dated Nov. 7, 2019.
(Continued)

*Primary Examiner* — Mounir Moutaouakil
(74) *Attorney, Agent, or Firm* — Harrity & Harrity, LLP

(57) ABSTRACT

Aspects of the disclosure generally relate to wireless communication. In some aspects, a wireless node may identify a first set of synchronization signal blocks (SSBs), within a synchronization signal (SS) burst set, that are used to indicate random access channel (RACH) occasions for a first wireless link type, the SS burst set including a second set of SSBs used to indicate RACH occasions for a second wireless link type; and transmit a RACH message in a RACH occasion corresponding to an SSB included in the first set of SSBs. In some aspects, a wireless node may configure an SS burst set to include a first set of SSBs to be used to indicate RACH occasions for a first wireless link type, and a second set of SSBs to be used to indicate RACH occasions for a second wireless link type; and transmit the SS burst set. Other aspects are provided.

30 Claims, 10 Drawing Sheets

(51) Int. Cl.
*H04W 80/02* (2009.01)
*H04W 56/00* (2009.01)

(58) Field of Classification Search
CPC ............. H04W 56/005; H04W 74/006; H04W 56/0005
See application file for complete search history.

(56) References Cited

U.S. PATENT DOCUMENTS

| | | | |
|---|---|---|---|
| 2019/0141754 A1* | 5/2019 | Bai ..................... | H04L 27/2607 |
| 2019/0150190 A1* | 5/2019 | Kim .................. | H04W 56/0015 370/329 |
| 2021/0160861 A1* | 5/2021 | You ..................... | H04W 72/042 |
| 2021/0168743 A1* | 6/2021 | Sheng .................. | H04W 24/10 |
| 2021/0168748 A1* | 6/2021 | Miao ................. | H04W 56/0015 |
| 2021/0195539 A1* | 6/2021 | Sheng .................. | H04W 56/00 |
| 2021/0195674 A1* | 6/2021 | Park ..................... | H04W 76/18 |
| 2022/0312353 A1* | 9/2022 | Tian ................... | H04W 56/001 |

OTHER PUBLICATIONS

LG Electronics Inc: "E-mail Discussion 101#69—PRACH Table", 3GPP TSG-RAN WG2 #101 bis, 3GPP Draft; R2-1805948 Email Discussion 101#69 PRACH Table, 3rd Generation Partnership Project (3GPP), Mobile Competence Centre; 650, Route Des Lucioles; F-06921 Sophiaantipolis Cedex; France, vol. RAN WG2, No. Sanya, P.R. of China; Apr. 16, 2018-Apr. 20, 2018, Apr. 6, 2018 (Apr. 6, 2018), pp. 1-23, XP051416304, Retrieved from the Internet: URL: http://www.3gpp.org/ftp/tsg%5Fran/WG2%5FRL2/TSGR2%5F101bis/Docs/ [retrieved on Apr. 6, 2018] p. 14-p. 23.

Liu J., et al., "Initial Access, Mobility, and User-Centric Multi-Beam Operation in 5G New Radio", IEEE Communications Magazine, vol. 56, No. 3, Mar. 1, 2018 (Mar. 1, 2018), pp. 35-41, XP055480195, US, ISSN: 0163-6804, DOI: 10.1109/MCOM.2018.1700827, p. 35, p. 37-p. 40.

Qualcomm Incorporated: "Remaining Details on RACH Procedure", 3GPP TSG-RAAN WG1 Meeting RAN1 92bis, 3GPP Draft; R1-1805527, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018, 15 Pages, XP051427515, Retrieved from the Internet: URL: http://www.3gpp.org/ftp/Meetings%5F3GPP%5FSYNC/RAN1/Docs/ [retrieved on Apr. 15, 2018] p. 4-p. 14.

Zte, et al., "Remaining Details of RACH Procedure", 3GPP TSG RAN WG1 Meeting #92bis, 3GPP Draft; R1-1803610, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 18 Pages, XP051425907, Retrieved from the Internet: URL: http://www.3gpp.org/ftp/Meetings%5F3GPP%5FSYNC/RAN1/Docs/ [retrieved on Apr. 15, 2018] p. 1-p. 12.

* cited by examiner

SEPARATION OF SYNCHRONIZATION SIGNAL BLOCKS FOR ACCESS AND BACKHAUL RANDOM ACCESS CHANNEL TRANSMISSIONS

CROSS-REFERENCE TO RELATED APPLICATION

This application claims priority to U.S. Provisional Patent Application No. 62/764,991, filed on Aug. 20, 2018, entitled "SEPARATION OF SYNCHRONIZATION SIGNAL BLOCKS FOR ACCESS AND BACKHAUL RANDOM ACCESS CHANNEL TRANSMISSIONS," which is hereby expressly incorporated by reference herein.

FIELD OF THE DISCLOSURE

Aspects of the present disclosure generally relate to wireless communication and to techniques and apparatuses for separation of synchronization signal blocks (SSBs) for access and backhaul random access channel (RACH) transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless node, may include identifying a first set of synchronization signal blocks (SSBs), within a synchronization signal (SS) burst set, that are used to indicate random access channel (RACH) occasions for a first wireless link type, the SS burst set including a second set of SSBs used to indicate RACH occasions for a second wireless link type; and transmitting a RACH message in a RACH occasion corresponding to an SSB index of an SSB included in the first set of SSBs.

In some aspects, a wireless node for wireless communication may include memory and one or more processors operatively coupled to the memory. The memory and the one or more processors may be configured to identify a first set of synchronization signal blocks (SSBs), within a synchronization signal (SS) burst set, that are used to indicate random access channel (RACH) occasions for a first wireless link type, the SS burst set including a second set of SSBs used to indicate RACH occasions for a second wireless link type; and transmit a RACH message in a RACH occasion corresponding to an SSB index of an SSB included in the first set of SSBs.

In some aspects, a non-transitory computer-readable medium may store one or more instructions for wireless communication. The one or more instructions, when executed by one or more processors of a wireless node, may cause the one or more processors to identify a first set of synchronization signal blocks (SSBs), within a synchronization signal (SS) burst set, that are used to indicate random access channel (RACH) occasions for a first wireless link type, the SS burst set including a second set of SSBs used to indicate RACH occasions for a second wireless link type; and transmit a RACH message in a RACH occasion corresponding to an SSB index of an SSB included in the first set of SSBs.

In some aspects, an apparatus for wireless communication may include means for identifying a first set of synchronization signal blocks (SSBs), within a synchronization signal (SS) burst set, that are used to indicate random access channel (RACH) occasions for a first wireless link type, the SS burst set including a second set of SSBs used to indicate RACH occasions for a second wireless link type; and means for transmitting a RACH message in a RACH occasion corresponding to an SSB index of an SSB included in the first set of SSBs.

In some aspects, a method of wireless communication, performed by a wireless node, may include configuring a synchronization signal (SS) burst set to include a first set of synchronization signal blocks (SSBs) to be used to indicate random access channel (RACH) occasions for a first wireless link type and a second set of SSBs to be used to indicate RACH occasions for a second wireless link type; and transmitting the SS burst set.

In some aspects, a wireless node for wireless communication may include memory and one or more processors operatively coupled to the memory. The memory and the one or more processors may be configured to configure a synchronization signal (SS) burst set to include a first set of synchronization signal blocks (SSBs) to be used to indicate random access channel (RACH) occasions for a first wireless link type and a second set of SSBs to be used to indicate RACH occasions for a second wireless link type; and transmit the SS burst set.

In some aspects, a non-transitory computer-readable medium may store one or more instructions for wireless communication. The one or more instructions, when executed by one or more processors of a wireless node, may cause the one or more processors to configure a synchronization signal (SS) burst set to include a first set of synchronization signal blocks (SSBs) to be used to indicate random access channel (RACH) occasions for a first wireless link type and a second set of SSBs to be used to indicate RACH occasions for a second wireless link type; and transmit the SS burst set.

In some aspects, an apparatus for wireless communication may include means for configuring a synchronization signal (SS) burst set to include a first set of synchronization signal blocks (SSBs) to be used to indicate random access channel (RACH) occasions for a first wireless link type and a second set of SSBs to be used to indicate RACH occasions for a second wireless link type; and means for transmitting the SS burst set.

Aspects generally include a method, apparatus, system, computer program product, non-transitory computer-readable medium, user equipment, base station, wireless communication device, wireless node, transmitter, receiver, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
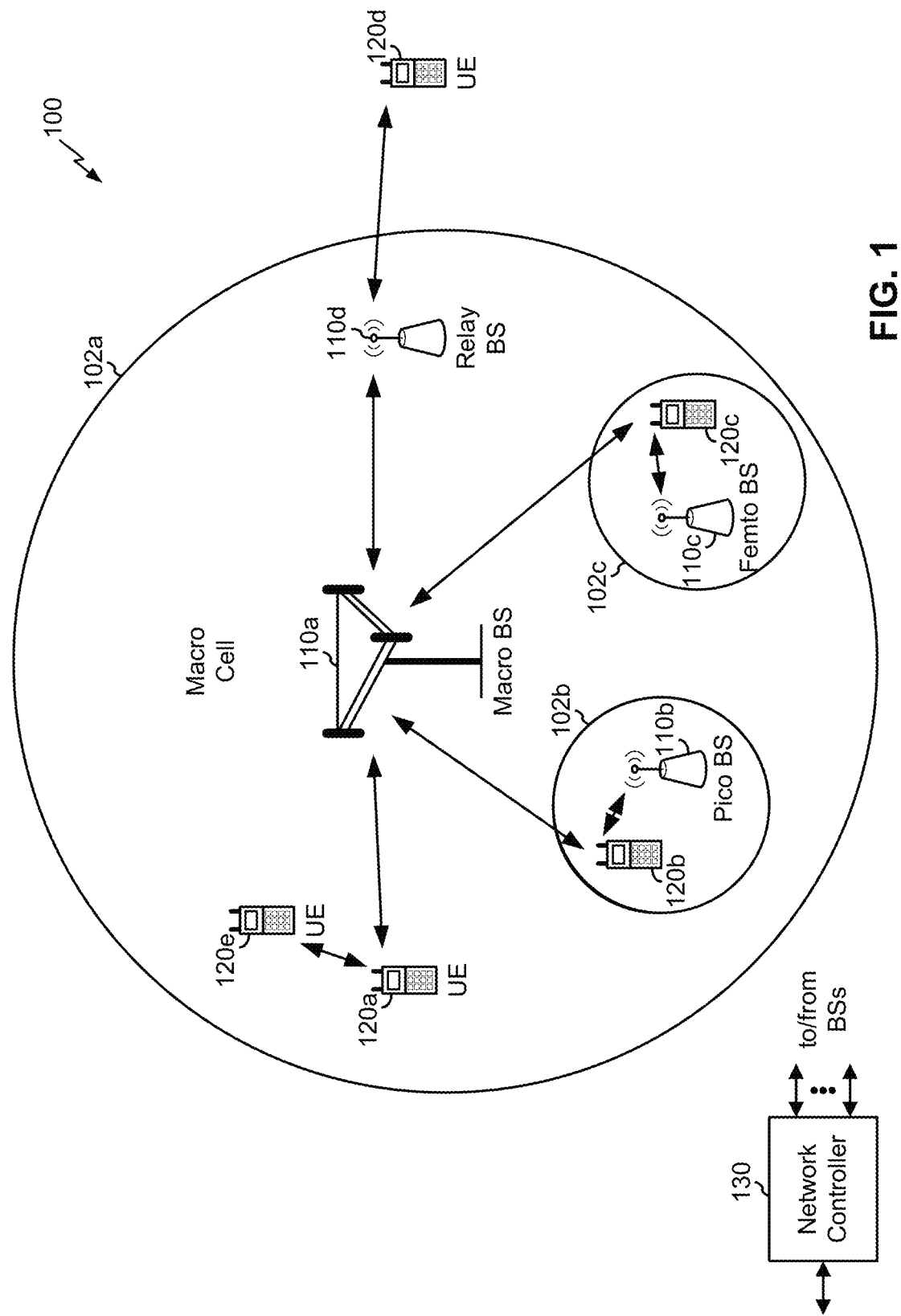
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
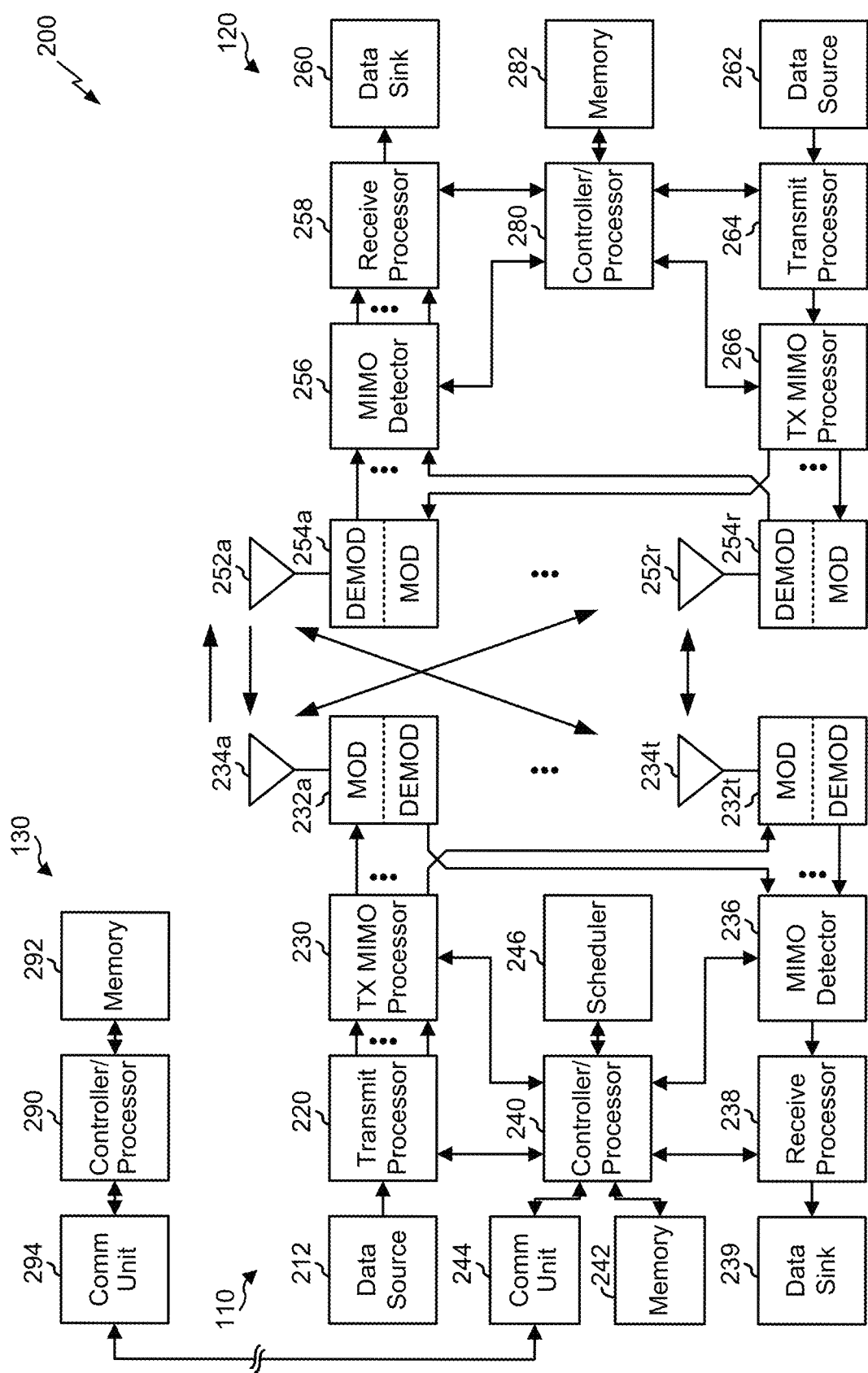
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with separation of synchronization signal blocks (SSBs) for access and backhaul random access channel (RACH) transmissions, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, a wireless node (e.g., base station 110, UE 120, and/or the like) may include means for identifying a first set of synchronization signal blocks (SSBs), within a synchronization signal (SS) burst set, that are used to indicate random access channel (RACH) occasions for a first wireless link type, the SS burst set including a second set of SSBs used to indicate RACH occasions for a second wireless link type; means for transmitting a RACH message in a RACH occasion corresponding to an SSB index of an SSB included in the first set of SSBs; and/or the like. Additionally, or alternatively, a wireless node (e.g., base station 110, UE 120, and/or the like) may include means for configuring a synchronization signal (SS) burst set to include a first set of synchronization signal blocks (SSBs) to be used to indicate random access channel (RACH) occasions for a first wireless link type and a second set of SSBs to be used to indicate RACH occasions for a second wireless link type; means for transmitting the SS burst set; and/or the like. In some aspects, such means may include one or more components of base station 110 and/or UE 120 described in connection with FIG. 2.

As indicated above, FIG. 2 is provided merely as an example. Other examples may differ from what is described with regard to FIG. 2.

Figure 3A:
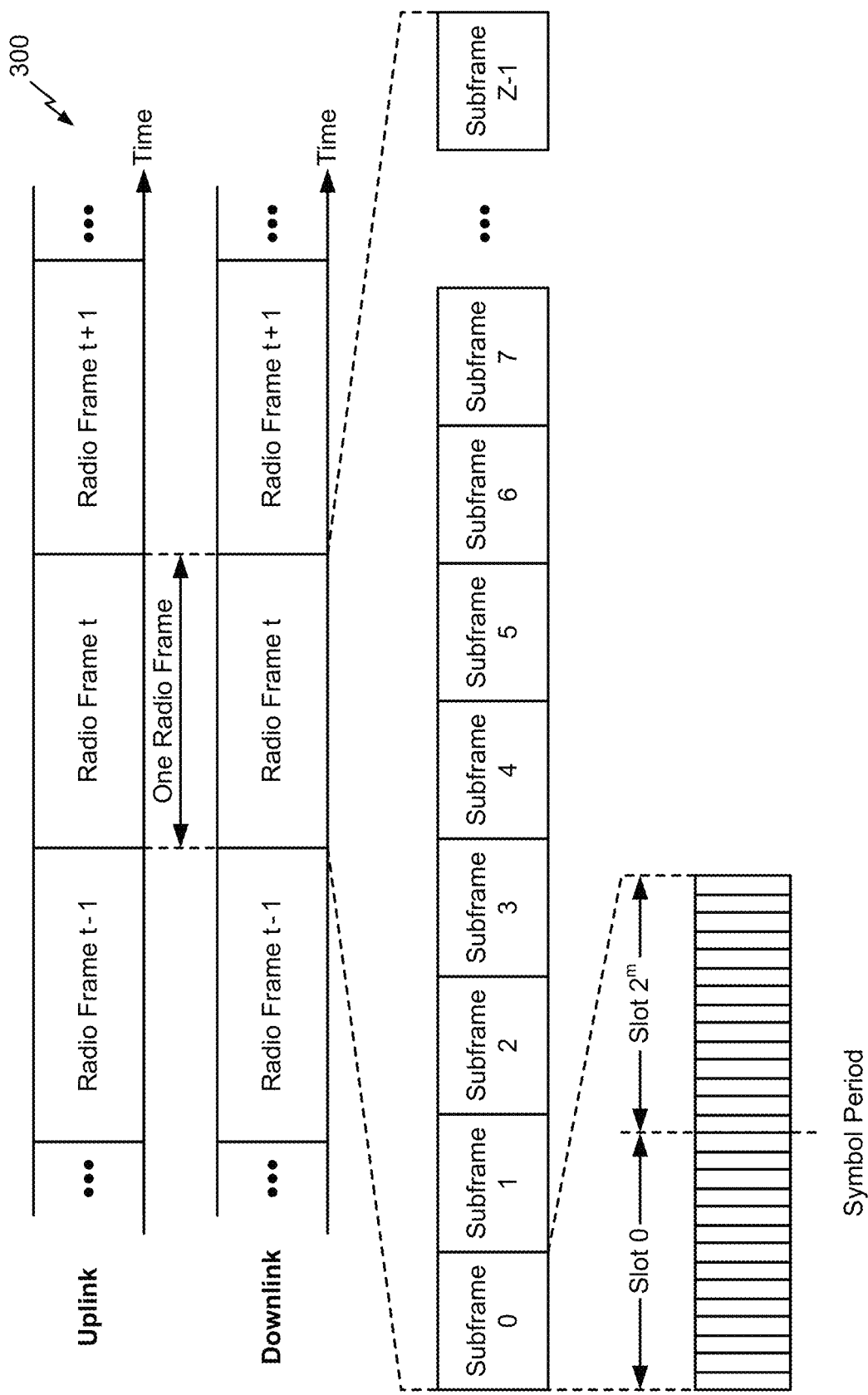
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
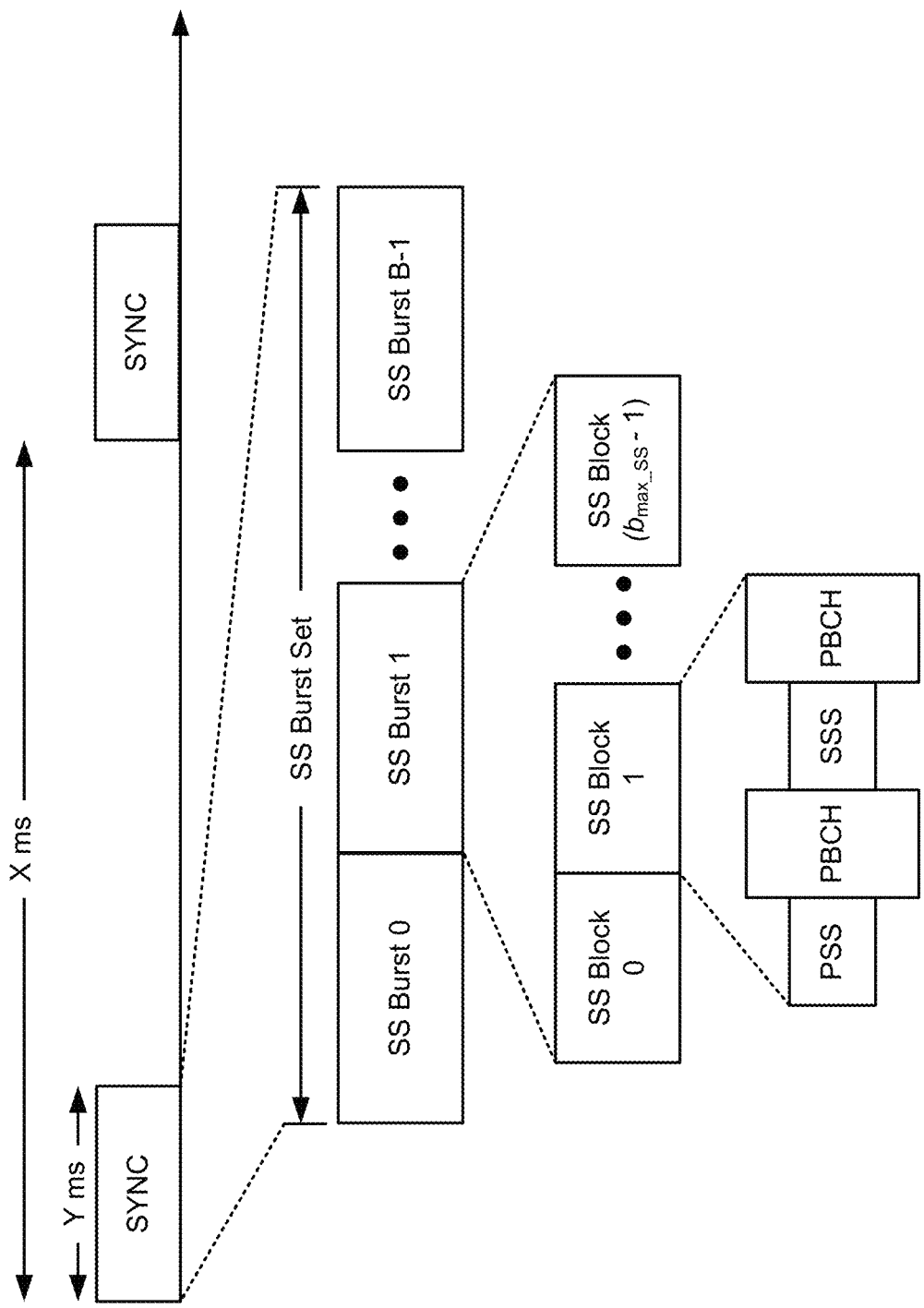
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
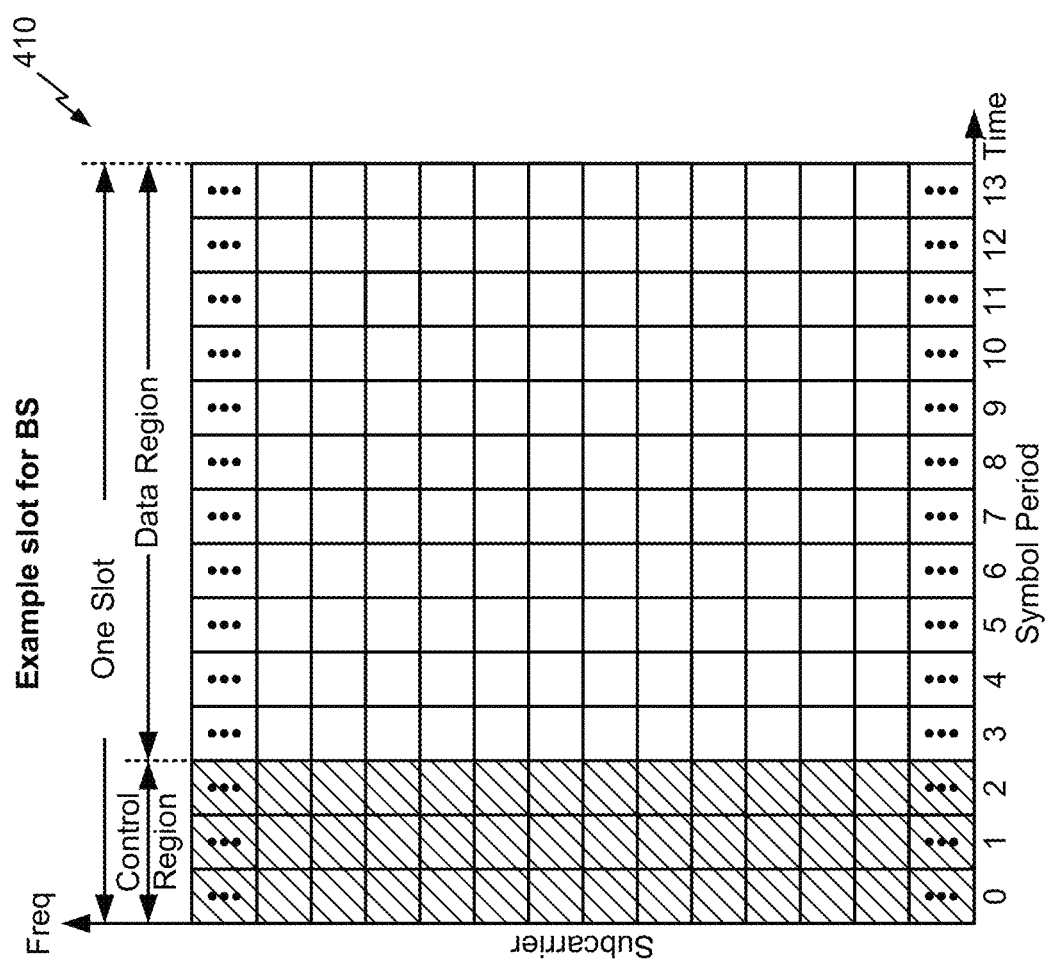
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported, and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
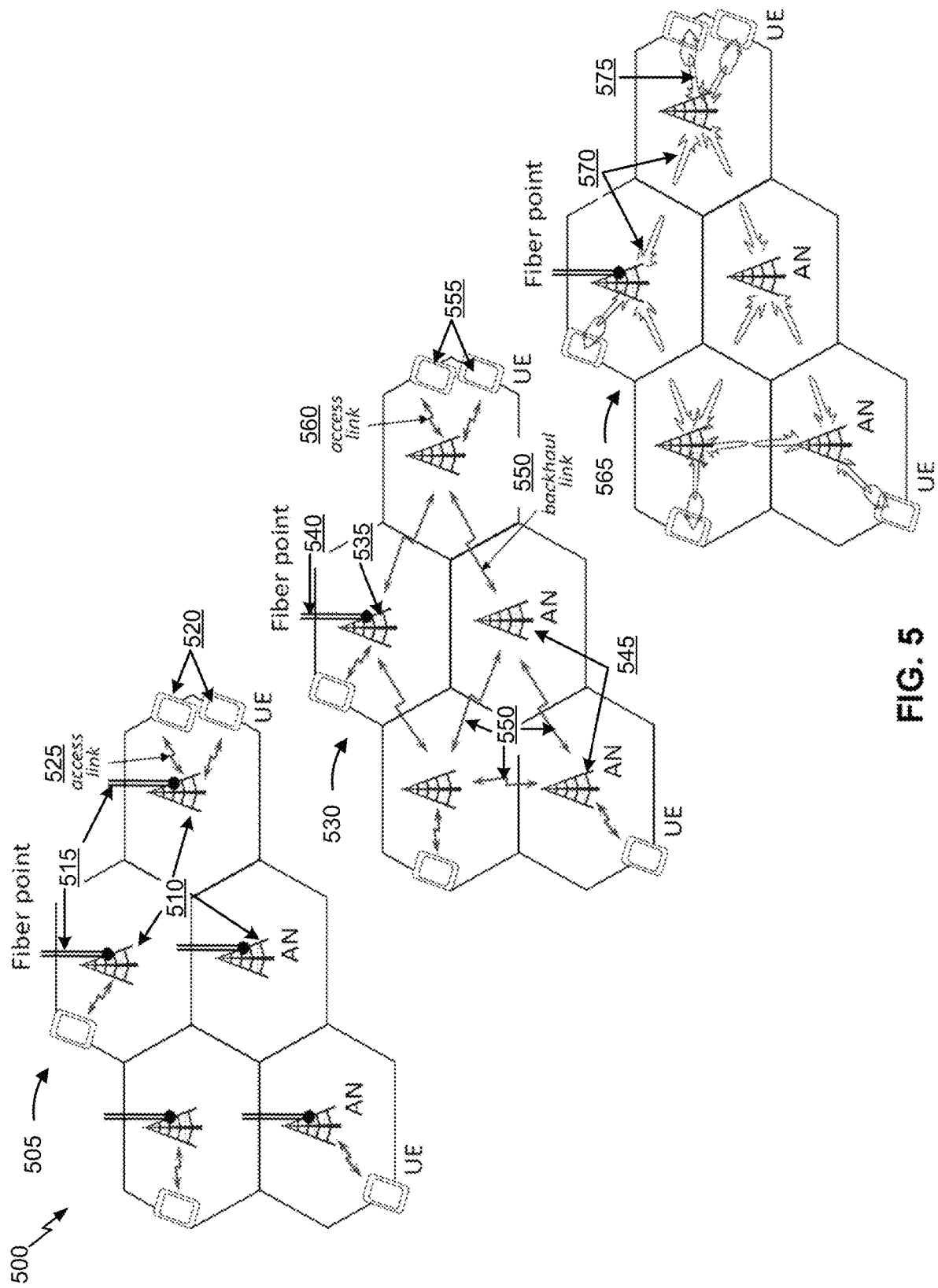
FIG. 5 is a diagram illustrating examples of radio access networks, in accordance with various aspects of the present disclosure.

FIG. 5 is a diagram illustrating examples 500 of radio access networks, in accordance with various aspects of the disclosure.

As shown by reference number 505, a traditional (e.g., 3G, 4G, LTE, and/or the like) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may correspond to a base station 110 shown in FIG. 1. Similarly, a UE 520 shown in FIG. 5 may correspond to a UE 120 shown in FIG. 1.

As shown by reference number 530, a radio access network may include a wireless backhaul network, where at least one base station is an anchor base station 535 that communicates with a core network via a wired backhaul link 540, such as a fiber connection. The wireless backhaul network may include one or more non-anchor base stations 545, also referred to as relay base stations, that communicate directly with or indirectly with (e.g., via one or more non-anchor base stations 545) the anchor base station 535 via one or more backhaul links 550 to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may correspond to a base station 110 shown in FIG. 1. Similarly, a UE 555 shown in FIG. 5 may correspond to a UE 120 shown in FIG. 1.

As shown by reference number 565, in some aspects, a radio access network that includes a wireless backhaul network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 570 between base stations may use millimeter waves to carry information and/or may be directed toward a target base station using beamforming, precoding, and/or the like. Similarly, the wireless access links 575 between a UE and a base station may use millimeter waves and/or may be directed toward a target wireless node (e.g., a UE and/or a base station). In this way, inter-link interference may be reduced.

The configuration of base stations and UEs in FIG. 5 is shown as an example, and other examples are contemplated.

For example, one or more base stations illustrated in FIG. 5 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 5 is provided as an example. Other examples may differ from what is described with regard to FIG. 5.

Figure 6:
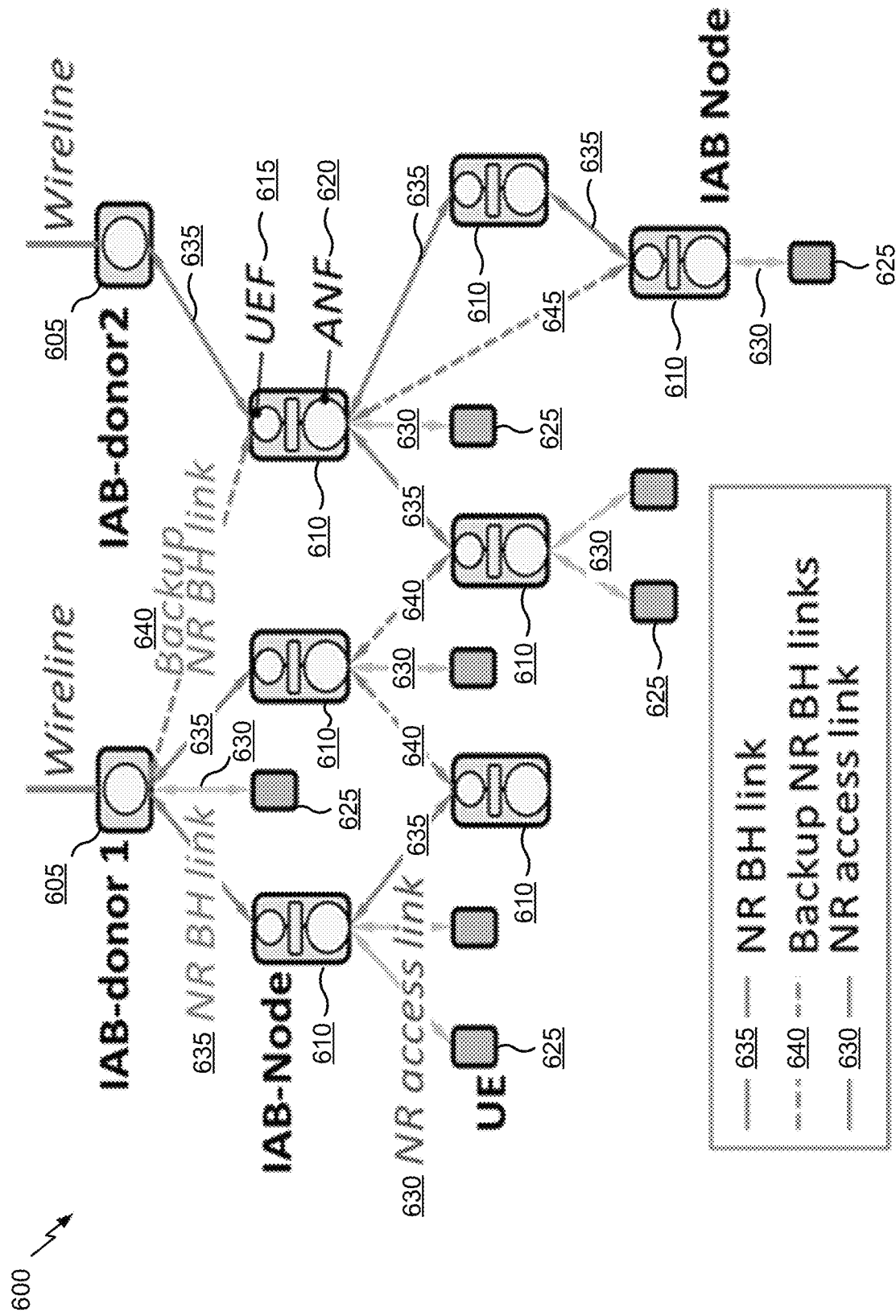
FIG. 6 is a diagram illustrating an example of an integrated access and backhaul (IAB) network architecture, in accordance with various aspects of the disclosure.

FIG. 6 is a diagram illustrating an example 600 of an integrated access and backhaul (IAB) network architecture, in accordance with various aspects of the disclosure.

As shown in FIG. 6, an IAB network may include anchor nodes 605, or IAB donors (shown as IAB-donor), that connect to a core network via a wired connection (shown as wireline). For example, an Ng interface of an anchor node 605 may terminate at a core network. Additionally, or alternatively, an anchor node 605 may connect to one or more devices of the core network that provide a core access and mobility management function (e.g., AMF). In some aspects, an anchor node 605 may include a base station 110, such as an anchor base station, as described above in connection with FIG. 5.

As further shown in FIG. 6, the IAB network may include non-anchor nodes 610, or IAB nodes (shown as IAB-Node). A non-anchor node 610 may provide integrated access and backhaul functionality, and may include UE functions (UEF) 615 and access node functions (ANF) 620. The UE functions 615 may be controlled and/or scheduled by another non-anchor node 610 and/or an anchor node 605. The AN functions 620 may control and/or schedule other non-anchor nodes 610 and/or UEs 625 (e.g., which may correspond to UEs 120). In some aspects, an anchor node 605 may include only AN functions 620, and not UE functions 615. That is, an anchor node 605 may control and schedule communications with non-anchor nodes 610 and/or UEs 625. Additionally, or alternatively, a UE 625 may include only UE functions 615, and not AN functions 620. That is, communications of a UE 625 may be controlled and/or scheduled by an anchor node 605 and/or a non-anchor node 610.

When a first node controls and/or schedules communications for a second node (e.g., when the first node provides AN functions for the second node's UE functions), the first node may be referred to as a parent node of the second node, and the second node may be referred to as a child node of the first node. Thus, an AN function 620 of a parent node may control and/or schedule communications for child nodes of the parent node. A parent node may be an anchor node 605 or a non-anchor node 610, and the child node may be a non-anchor node 610 or a UE 625. Communications of a UE function 615 of a child node may be controlled and/or scheduled by a parent node of the child node.

As further shown in FIG. 6, a link between a UE 625 (e.g., which only has UE functions 615, and not AN functions 620) and an anchor node 605, or between a UE 625 and a non-anchor node 610, may be referred to as an access link 630. Access link 630 may be a wireless access link that provides a UE 625 with radio access to a core network via an anchor node 605, and optionally via one or more non-anchor nodes 610.

As further shown in FIG. 6, a link between an anchor node 605 and a non-anchor node 610 or between two non-anchor nodes 610 may be referred to as a backhaul link 635. Backhaul link 635 may be a wireless backhaul link that provides a non-anchor node 610 with radio access to a core network via an anchor node 605, and optionally via one or more other non-anchor nodes 610. In some aspects, a backhaul link 635 may be a primary backhaul link (shown as backhaul link 635) or a secondary backhaul link 640 (e.g., a backup backhaul link). In some aspects, a secondary backhaul link 640 may be used if a primary backhaul link fails, becomes congested, becomes overloaded, and/or the like.

In an IAB network, radio resources (e.g., time resources, frequency resources, spatial/beam resources, and/or the like) may be shared between access links and backhaul links, including for random access channel (RACH) procedures. However, access links and backhaul links may have different characteristics, use cases, deployment scenarios, requirements, and/or the like, which may complicate such resource sharing. For example, backhaul links may need to support a longer link distance than access links due to, for example, a longer distance between two access nodes (e.g., an anchor node 605 and a non-anchor node 610, or two non-anchor nodes 610) as compared to a distance between an access node and a UE 625, congestion at an intermediate non-anchor node (e.g., as shown by reference number 645), remote non-anchor nodes 610, and/or the like.

As a result, if the same resources are used for a random access channel (RACH) procedure for both access links and backhaul links, there may be increased interference due to a smaller number of supportable cyclic shifts for the RACH procedure. Furthermore, a first RACH preamble format may be better suited for a RACH procedure on an access link, and a second RACH preamble format may be better suited for a RACH procedure on a backhaul link (e.g., due to a cyclic prefix duration that supports a larger cell radius).

Some techniques and apparatuses described herein permit separation of synchronization signal blocks (SSBs), of an SS burst set, into a first set of SSBs used for an access link RACH procedure and a second set of SSBs used for a backhaul link RACH procedure. For example, SSBs in the first set may map to RACH occasions for transmission of a RACH message (e.g., message 1) for establishing an access link, and SSBs in the second set may map to RACH occasions for transmission of a RACH message (e.g., message 1) for establishing a backhaul link. In this way, RACH interference may be reduced, RACH procedures for access links and backhaul links may be configured differently to support different requirements (e.g., using different RACH preambles), and/or the like. Additional details are described below.

As indicated above, FIG. 6 is provided as an example. Other examples may differ from what is described with regard to FIG. 6.

Figure 7:
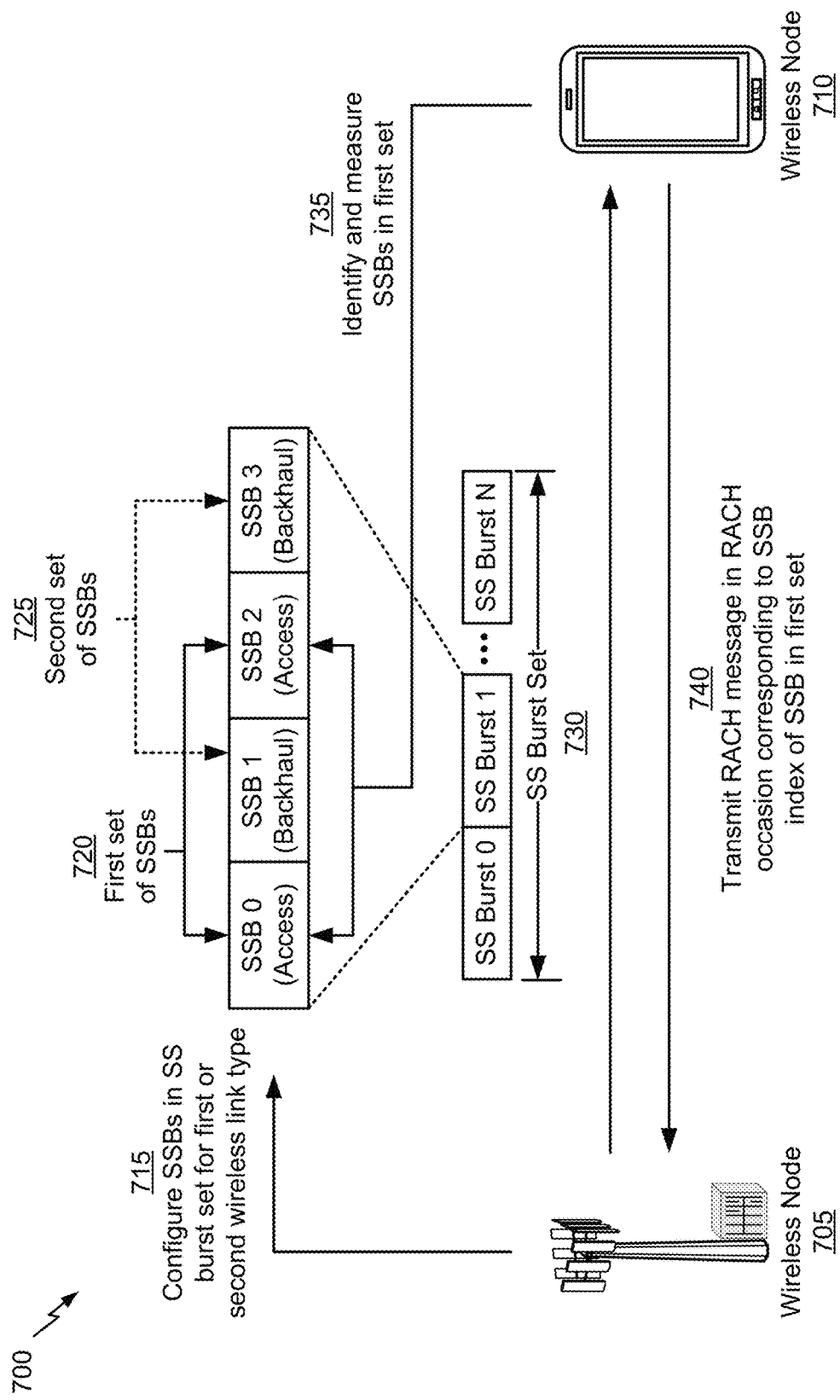
FIG. 7 is a diagram illustrating an example of separation of synchronization signal blocks (SSBs) for access and backhaul random access channel (RACH) transmissions, in accordance with various aspects of the present disclosure.

FIG. 7 is a diagram illustrating an example 700 of separation of SSBs for access and backhaul RACH transmissions, in accordance with various aspects of the present disclosure.

As shown in FIG. 7, a first wireless node 705 (shown as a base station) and a second wireless node 710 (shown as a UE) may communicate with one another. In some aspects, the first wireless node 705 may be a base station 110, such as an anchor base station, a non-anchor base station, a parent node, a device with an AN function 620, and/or the like. In some aspects, the second wireless node 710 may be a UE 120, a base station 110 (e.g., a non-anchor base station), a child node, a device with a UE function 615, and/or the like. The first wireless node 705 may control and/or schedule communications of the second wireless node 710. In some aspects, the first wireless node 705 and the second wireless node 710 may communicate in an IAB network.

As shown by reference number 715, the first wireless node 705 may configure synchronization signal blocks (SSBs), in an SS burst set, for a first wireless link type or a second wireless link type. For example, the first wireless node 705 may configure the SS burst set to include a first set of SSBs associated with a first wireless link type, and may configure the SS burst set to include a second set of SSBs associated with a second wireless link type. A wireless link type may include a wireless access link, a wireless backhaul link, and/or the like, as described above in connection with FIGS. 5-6.

As shown by reference number 720, the first wireless node 705 may configure a first set of SSBs, in the SS burst set, for a first wireless link type. Such a configuration may map the first set of SSBs to random access channel (RACH) occasions (e.g., time and/or frequency resources, resource elements, and/or the like) to be used for a RACH procedure for the first wireless link type. One or more of the RACH occasions may be used by a device that receives SSBs (e.g., one or more second wireless nodes 710) to transmit a RACH message (e.g., RACH message 1, or MSG1) for establishing and/or communicating via a first wireless link of the first wireless link type. In example 700, the first wireless node 705 configures SSB 0 and SSB 2, within SS burst 1 of an SS burst set, for a wireless access link.

As shown by reference number 725, the first wireless node 705 may configure a second set of SSBs, in the SS burst set, for a second wireless link type. Such a configuration may map the second set of SSBs to RACH occasions to be used for a RACH procedure for the second wireless link type. One or more of the RACH occasions may be used by a device that receives SSBs (e.g., one or more second wireless nodes 710) to transmit a RACH message (e.g., RACH message 1, or MSG1) for establishing and/or communicating via a second wireless link of the second wireless link type. In example 700, the first wireless node 705 configures SSB 1 and SSB 3, within SS burst 1 of an SS burst set, for a wireless backhaul link.

In some aspects, the first wireless link type is one of a wireless access link or a wireless backhaul link, and the second wireless link type is the other one of the wireless access link or the wireless backhaul link. For example, as shown, the first wireless link type may be a wireless access link, and the second wireless link type may be a wireless backhaul link. Alternatively, the first wireless link type may be a wireless backhaul link, and the second wireless link type may be a wireless access link. Although some techniques are described herein as separating SSBs within an SS burst set for different wireless link types, in some aspects, SSBs within an SS burst set may be separated for other types of differing configurations. In general, the first wireless node 705 may configure the first set of SSBs for use with a first configuration, and may configure the second set of SSBs for use with a second configuration. In some aspects, the first wireless node 705 may configure more than two sets of SSBs in the SS burst set, corresponding to more than two configuration types.

In some aspects, the first set of SSBs and the second set of SSBs may be mutually exclusive. That is, any SSB included in the first set may not be included in the second set, and any SSB included in the second set may not be included in the first set. Alternatively, some SSBs may be included in both the first set and the second set (e.g., some SSBs may be used for a RACH procedure for both the first wireless link type and the second wireless link type), and some SSBs may be exclusive to a single set. For example, one of the first set of SSBs or the second set of SSBs may include all SSBs in the SS burst set (e.g., SSBs that are actually transmitted), and the other of the first set or the second set may include a subset of those SSBs in the SS burst set.

As shown by reference number 730, the first wireless node 705 may transmit the SS burst set. For example, the first wireless node 705 may transmit one or more SSBs on one or more resource elements configured and/or reserved for SSB transmission. In some aspects, different SSBs within an SS burst and/or an SS burst set may have different beamforming and/or precoding configurations.

As shown by reference number 735, the second wireless node 710 may identify SSBs, in the SS burst set, relevant to the second wireless node 710, depending on a type of wireless link that the second wireless node 710 is attempting to establish and/or use to communicate. In example 700, the second wireless node 710 is a UE 120 attempting to establish a wireless access link with the first wireless node 705. Thus, in this case, the second wireless node 710 identifies SSBs included in the first set of SSBs used for wireless access links. However, if the second wireless node 710 were a base station 110 attempting to establish a wireless backhaul link with the first wireless node 705, then the second wireless node 710 would identify SSBs included in the second set of SSBs used for wireless backhaul links.

In some aspects, the first wireless node 705 may indicate the first set of SSBs and/or the second set of SSBs to the second wireless node 710 (e.g., using explicit signaling or implicit signaling), and the second wireless node 710 may identify the first set of SSBs and/or the second set of SSBs based at least in part on the indication. For example, the first wireless node 705 may indicate the first set of SSBs and/or the second set of SSBs in a physical broadcast channel (PBCH) communication, a system information block (SIB), remaining minimum system information (RMSI), other system information (OSI), a handover command, a primary synchronization signal (PSS), a secondary synchronization signal (SSS), a channel state information reference signal (CSI-RS), downlink control information (DCI), a media access control (MAC) control element (MAC-CE), and/or the like. The first set of SSBs and/or the second set of SSBs may be indicated, for example, by signaling a first set of SSB indices that identify the first set of SSBs, by signaling a second set of SSB indices that identify the second set of SSBs, by signaling an index value that maps to a corresponding table entry (e.g., of a table stored by the first wireless node 705 and/or the second wireless node 710) that indicates SSB indices of the first set of SSBs and/or the second set of SSBs, and/or the like.

Additionally, or alternatively, the first wireless node 705 may indicate the first set of SSBs and/or the second set of SSBs to the second wireless node 710 based at least in part on a RACH configuration index (sometimes referred to as a physical RACH (PRACH) configuration index), which may be indicated in system information (e.g., RMSI, OSI, a system information block, and/or the like). A RACH configuration index may indicate, for example, RACH preamble formats corresponding to RACH occasions, time resources in which those RACH occasions are located, and/or the like. For example, the RACH configuration index may indicate that a first RACH occasion is associated with a first RACH preamble format, that a second RACH occasion is associated with a second preamble format, and/or the like.

In some aspects, the first set of SSBs may be associated with the first RACH preamble format, and the second set of SSBs may be associated with the second RACH preamble format. In this case, the second wireless node 710 may identify the first set of SSBs by using the RACH configuration index to identify RACH occasions associated with the first preamble format, and identifying the first set of SSBs as SSBs that map to the RACH occasions associated with the first preamble format (e.g., using one or more prespecified mapping rules to map SSB indices to RACH occasions). As an example, a RACH message (e.g., MSG1) for a wireless access link may be transmitted using RACH preamble format B (e.g., wireless access links may be associated with RACH preamble format B). Additionally, or alternatively, a RACH message for a wireless backhaul link may be transmitted using RACH preamble format A (e.g., wireless backhaul links may be associated with RACH preamble format A).

In some aspects, a mapping between wireless link types and RACH preamble formats may be prespecified (e.g., in a wireless communication standard) and/or may be hard coded in memory of the first wireless node 705 and/or the second wireless node 710. Additionally, or alternatively, the mapping may be indicated by the first wireless node 705 to the second wireless node 710. For example, the mapping may be indicated in a PBCH communication, a SIB, RMSI, OSI, a handover command, a PSS, an SSS, a CSI-RS, DCI, a MAC-CE, and/or the like.

After identifying the set of SSBs to be used by the second wireless node 710 for a specific wireless link type of a wireless link to be established and/or used for communication, the second wireless node 710 may measure that set of SSBs. Based at least in part on such measurements, the second wireless node 710 may identify a specific SSB (e.g., the best SSB in the set, the SSB with characteristics and/or signal parameters that satisfy a threshold with respect to the other SSBs in the set, and/or the like), may identify a set of RACH occasions corresponding to the specific SSB, and may select (e.g., randomly, pseudo-randomly, and/or the like) a RACH occasion in the set of RACH occasions for transmission of a RACH message (e.g., MSG1).

As shown by reference number 740, the second wireless node 710 may transmit a RACH message in a RACH occasion corresponding to an SSB index of an SSB included in the set of SSBs relevant to the second wireless node 710 (e.g., the first set of SSBs in example 700). As described above, the second wireless node 710 may identify a specific SSB in the set of SSBs. The second wireless node 710 may then determine an SSB index of that SSB, and may determine one or more RACH occasions that map to the SSB index (e.g., using a prespecified rule that indicates a mapping of SSB indices to RACH occasions). The second wireless node 710 may select (e.g., randomly, pseudo-randomly, and/or the like) a RACH occasion from the one or more RACH occasions, and may transmit the RACH message in the RACH occasion. In some aspects, the second wireless node 710 may transmit the RACH message using a RACH preamble format corresponding to the set of SSBs and/or indicated by a RACH configuration index. By separating SSBs of an SS burst set into a first set of SSBs used for an access link RACH procedure and a second set of SSBs used for a backhaul link RACH procedure, RACH interference may be reduced, RACH procedures for access links and backhaul links may be configured differently to support different requirements (e.g., using different RACH preambles), and/or the like.

In some aspects, when the second wireless node 710 is in an idle mode (e.g., RRC-idle), the second wireless node 710 may receive an indication of only the set of SSBs for a wireless link type associated with the second wireless node 710 (referred to below as a first set of SSBs for example 700), and may not receive an indication of the set of SSBs for a wireless link type not associated with the second wireless node 710 (referred to below as a second set of SSBs for example 700). In example 700, when in an idle mode, the second wireless node 710 may receive an indication of only the first set of SSBs, and may not receive an indication of the second set of SSBs. In some aspects, the indication of the first set of SSBs may be received in system information, such as a SIB, RMSI, and/or the like. In some aspects, such an indication may be 16 bits, and may indicate an SSB pattern for a set of 64 possible SSBs. The SSB pattern may indicate the SSBs included in the first set of SSBs. Thus, the second wireless node 710 may use this information to perform a RACH procedure and enter a connected mode (e.g., RRC-connected) with the first wireless node 705.

When in the connected mode, the second wireless node 710 may receive a more granular indication of the first set of SSBs as compared to the indication received with the second wireless node 710 is in the idle mode. For example, the indication in connected mode may be 64 bits, with one bit corresponding to each SSB of a set of 64 possible SSBs. In some aspects, this indication may be indicated in a radio resource control (RRC) message (e.g., an RRC configuration message, an RRC reconfiguration message, and/or the like). Additionally, or alternatively, when in the connected mode, the second wireless node 710 may receive an indication of the second set of SSBs (e.g., which may not be received when the second wireless node 710 is in the idle mode), such as in an RRC message. In some aspects, the second wireless node 710 may use the indication of the second set of SSBs to perform rate matching (e.g., to rate match one or more communications, such as PDSCH communications, around the second set of SSBs). Additionally, or alternatively, the second wireless node 710 may perform rate matching around the first set of SSBs. In this way, spectral efficiency may be improved.

As indicated above, FIG. 7 is provided as an example. Other examples may differ from what is described with respect to FIG. 7.

Figure 8:
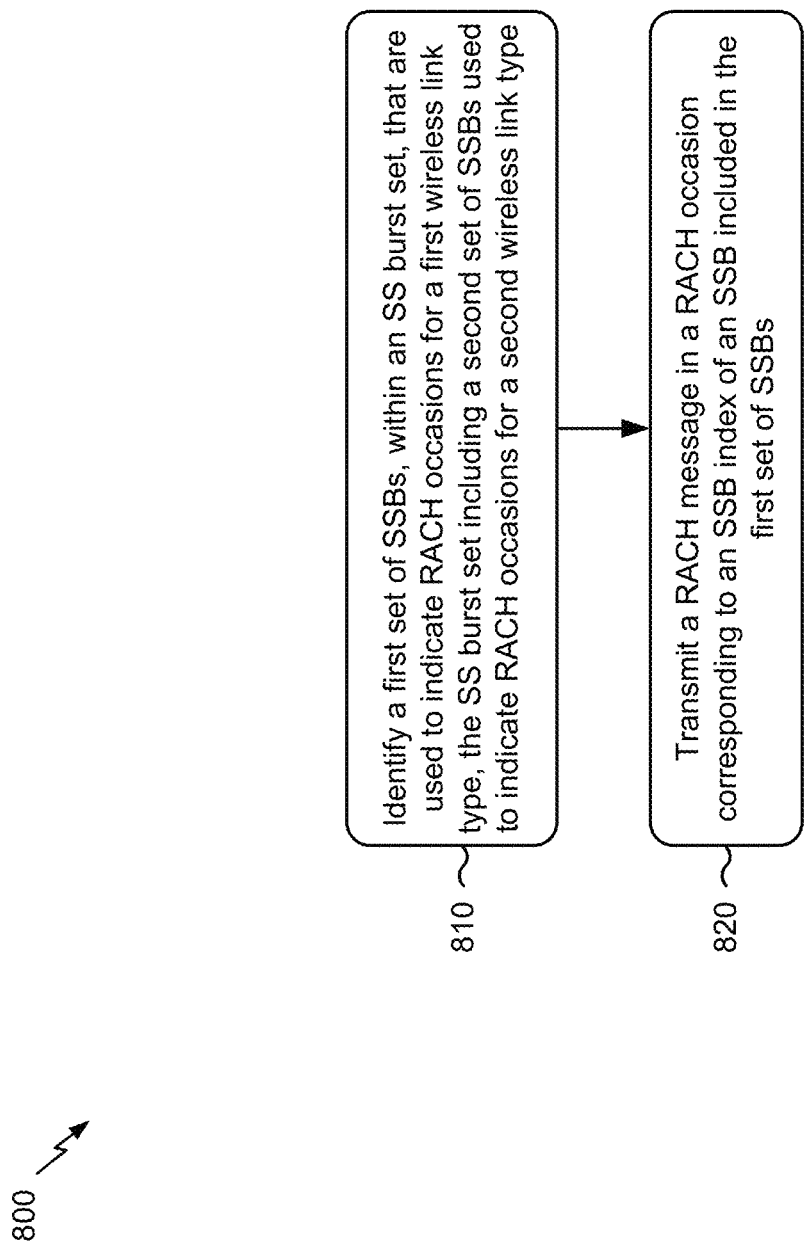
FIGS. 8-9 are diagram illustrating example processes performed, for example, by a wireless node, in accordance with various aspects of the present disclosure.

FIG. 8 is a diagram illustrating an example process 800 performed, for example, by a wireless node, in accordance with various aspects of the present disclosure. Example process 800 is an example where a wireless node (e.g., base station 110, UE 120, non-anchor base station 545, UE 555, non-anchor node 610, UE 625, wireless node 710, and/or the like) performs operations associated with separation of SSBs for access and backhaul RACH transmissions.

As shown in FIG. 8, in some aspects, process 800 may include identifying a first set of synchronization signal blocks (SSBs), within a synchronization signal (SS) burst set, that are used to indicate random access channel (RACH) occasions for a first wireless link type, the SS burst set including a second set of SSBs used to indicate RACH occasions for a second wireless link type (block 810). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may identify a first set of SSBs, within an SS burst set, that are used to indicate RACH occasions for a first wireless link type, as described above in connection with FIG. 7. In some aspects, the SS burst set includes a second set of SSBs used to indicate RACH occasions for a second wireless link type.

As further shown in FIG. 8, in some aspects, process 800 may include transmitting a RACH message in a RACH occasion corresponding to an SSB index of an SSB included in the first set of SSBs (block 820). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit a RACH message in a RACH occasion corresponding to an SSB index of an SSB included in the first set of SSBs, as described above in connection with FIG. 7.

Process 800 may include additional aspects, such as any single aspect or any combination of aspects described below and/or in connection with one or more other processes described elsewhere herein.

In a first aspect, the first wireless link type is one of a wireless access link or a wireless backhaul link, and the second wireless link type is the other one of the wireless access link or the wireless backhaul link.

In a second aspect, alone or in combination with the first aspect, the first set of SSBs is associated with a first RACH preamble format, and the second set of SSBs is associated with a second RACH preamble format.

In a third aspect, alone or in combination with one or more of the first and second aspects, the first set of SSBs is identified based at least in part on a RACH configuration index that indicates RACH preamble formats.

In a fourth aspect, alone or in combination with one or more of the first through third aspects, the first set of SSBs is identified based at least in part on an indication from another wireless node.

In a fifth aspect, alone or in combination with one or more of the first through fourth aspects, the indication is indicated using at least one of a physical broadcast channel communication, a system information block, remaining minimum system information, other system information, a handover command, a primary synchronization signal, a secondary synchronization signal, a channel state information reference signal, downlink control information, a media access control (MAC) control element, or a combination thereof.

In a sixth aspect, alone or in combination with one or more of the first through fifth aspects, both the first set of SSBs and the second set of SSBs are identified by the wireless node.

In a seventh aspect, alone or in combination with one or more of the first through sixth aspects, the first set of SSBs is identified using system information when the wireless node is in idle mode.

In an eighth aspect, alone or in combination with one or more of the first through seventh aspects, the second set of SSBs is identified using a radio resource control message when the wireless node is in connected mode.

In a ninth aspect, alone or in combination with one or more of the first through eighth aspects, the first set of SSBs and the second set of SSBs are identified using a radio resource control message when the wireless node is in connected mode.

In a tenth aspect, alone or in combination with one or more of the first through ninth aspects, the wireless node is configured to rate match one or more communications around the second set of SSBs.

In an eleventh aspect, alone or in combination with one or more of the first through tenth aspects, the first set of SSBs and the second set of SSBs are mutually exclusive.

In a twelfth aspect, alone or in combination with one or more of the first through eleventh aspects, one of the first set of SSBs or the second set of SSBs includes all SSBs in the SS burst set, and the other one of the first set of SSBs or the second set of SSBs includes a subset of SSBs in the SS burst set.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
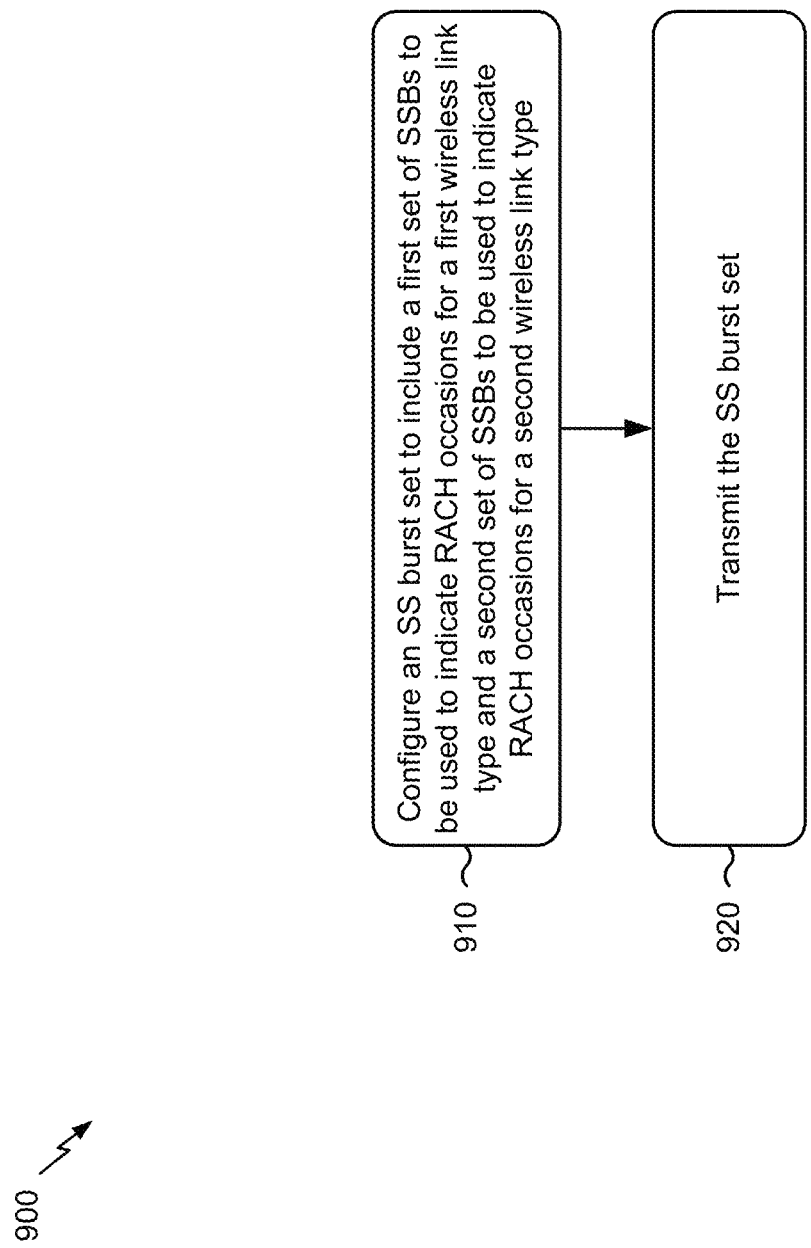

FIG. 9 is a diagram illustrating an example process 900 performed, for example, by a wireless node, in accordance with various aspects of the present disclosure. Example process 900 is an example where a wireless node (e.g., base station 110, UE 120, anchor base station 535, non-anchor base station 545, anchor node 605, non-anchor node 610, wireless node 705, and/or the like) performs operations associated with separation of SSBs for access and backhaul RACH transmissions.

As shown in FIG. 9, in some aspects, process 900 may include configuring a synchronization signal (SS) burst set to include a first set of synchronization signal blocks (SSBs) to be used to indicate random access channel (RACH) occasions for a first wireless link type and a second set of SSBs to be used to indicate RACH occasions for a second wireless link type (block 910). For example, the base station (e.g., using controller/processor 240 and/or the like) may configure an SS burst set to include a first set of SSBs to be used to indicate RACH occasions for a first wireless link type and a second set of SSBs to be used to indicate RACH occasions for a second wireless link type, as described above in connection with FIG. 7.

As further shown in FIG. 9, in some aspects, process 900 may include transmitting the SS burst set (block 920). For example, the base station (e.g., using controller/processor 240, transmit processor 220, TX MIMO processor 230, MOD 232, antenna 234, and/or the like) may transmit the SS burst set, as described above in connection with FIG. 7.

Process 900 may include additional aspects, such as any single aspect or any combination of aspects described below and/or in connection with one or more other processes described elsewhere herein.

In a first aspect, the first wireless link type is one of a wireless access link or a wireless backhaul link, and the second wireless link type is the other one of the wireless access link or the wireless backhaul link.

In a second aspect, alone or in combination with the first aspect, the first set of SSBs is associated with a first RACH preamble format, and the second set of SSBs is associated with a second RACH preamble format.

In a third aspect, alone or in combination with one or more of the first and second aspects, at least one of the first set of SSBs or the second set of SSBs is indicated to another wireless node.

In a fourth aspect, alone or in combination with one or more of the first through third aspects, at least one of the first set of SSBs or the second set of SSBs is indicated based at least in part on a RACH configuration index that indicates RACH preamble formats.

In a fifth aspect, alone or in combination with one or more of the first through sixth aspects, at least one of the first set of SSBs or the second set of SSBs is indicated using at least one of a physical broadcast channel communication, a system information block, remaining minimum system information, other system information, a handover command, a primary synchronization signal, a secondary synchronization signal, a channel state information reference signal, downlink control information, a media access control (MAC) control element, or a combination thereof.

In a sixth aspect, alone or in combination with one or more of the first through fifth aspects, both the first set of SSBs and the second set of SSBs are indicated to another wireless node.

In a seventh aspect, alone or in combination with one or more of the first through sixth aspects, the first set of SSBs is indicated to another wireless node using system information when the other wireless node is in idle mode.

In an eighth aspect, alone or in combination with one or more of the first through seventh aspects, the second set of SSBs is indicated to another wireless node using a radio resource control message when the other wireless node is in connected mode.

In a ninth aspect, alone or in combination with one or more of the first through eighth aspects, the first set of SSBs and the second set of SSBs are indicated to another wireless node using a radio resource control message when the other wireless node is in connected mode.

In a tenth aspect, alone or in combination with one or more of the first through ninth aspects, the first set of SSBs and the second set of SSBs are mutually exclusive.

In an eleventh aspect, alone or in combination with one or more of the first through tenth aspects, one of the first set of SSBs or the second set of SSBs includes all SSBs in the SS burst set, and the other one of the first set of SSBs or the second set of SSBs includes a subset of SSBs in the SS burst set.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless node, comprising:
   identifying a first set of synchronization signal blocks (SSBs) used to indicate random access channel (RACH) occasions for a wireless access link and a second set of SSBs used to indicate RACH occasions for a wireless backhaul link, wherein the first set of SSBs and the second set of SSBs are mutually exclusive; and
   transmitting a RACH message in a RACH occasion corresponding to an SSB index of an SSB included in the first set of SSBs.

2. The method of claim 1, wherein the first set of SSBs is associated with a first RACH preamble format, and wherein the second set of SSBs is associated with a second RACH preamble format.

3. The method of claim 1, wherein the first set of SSBs is identified based at least in part on a RACH configuration index that indicates RACH preamble formats.

4. The method of claim 1, wherein the first set of SSBs is identified based at least in part on an indication from another wireless node.

5. The method of claim 4, wherein the indication is indicated using at least one of a physical broadcast channel communication, a system information block, remaining minimum system information, other system information, a handover command, a primary synchronization signal, a secondary synchronization signal, a channel state information reference signal, downlink control information, a media access control (MAC) control element, or a combination thereof.

6. The method of claim 1, wherein both the first set of SSBs and the second set of SSBs are identified by the wireless node.

7. The method of claim 1, wherein the first set of SSBs is identified using system information when the wireless node is in idle mode.

8. The method of claim 1, wherein the second set of SSBs is identified using a radio resource control message when the wireless node is in connected mode.

9. The method of claim 1, wherein the first set of SSBs and the second set of SSBs are identified using a radio resource control message when the wireless node is in connected mode.

10. The method of claim 1, wherein the wireless node is configured to rate match one or more communications around the second set of SSBs.

11. The method of claim 1, wherein the first set of SSBs and the second set of SSBs are within a synchronization signal (SS) burst set.

12. A method of wireless communication performed by a wireless node, comprising:
    configuring a first set of synchronization signal blocks (SSBs) to be used to indicate random access channel (RACH) occasions for a wireless access link and a second set of SSBs to be used to indicate RACH occasions for a wireless backhaul link, wherein the first set of SSBs and the second set of SSBs are mutually exclusive; and
    transmitting at least one of the first set of SSBs or the second set of SSBs.

13. The method of claim 12, wherein the first set of SSBs is associated with a first RACH preamble format, and wherein the second set of SSBs is associated with a second RACH preamble format.

14. The method of claim 12, wherein at least one of the first set of SSBs or the second set of SSBs is indicated to another wireless node.

15. The method of claim 12, wherein at least one of the first set of SSBs or the second set of SSBs is indicated based at least in part on a RACH configuration index that indicates RACH preamble formats.

16. The method of claim 12, wherein at least one of the first set of SSBs or the second set of SSBs is indicated using at least one of a physical broadcast channel communication, a system information block, remaining minimum system information, other system information, a handover command, a primary synchronization signal, a secondary synchronization signal, a channel state information reference signal, downlink control information, a media access control (MAC) control element, or a combination thereof.

17. The method of claim 12, wherein both the first set of SSBs and the second set of SSBs are indicated to another wireless node.

18. The method of claim 12, wherein the first set of SSBs is indicated to another wireless node using system information when the other wireless node is in idle mode.

19. The method of claim 12, wherein the second set of SSBs is indicated to another wireless node using a radio resource control message when the other wireless node is in connected mode.

20. The method of claim 12, wherein the first set of SSBs and the second set of SSBs are indicated to another wireless node using a radio resource control message when the other wireless node is in connected mode.

21. The method of claim 12, wherein the first set of SSBs and the second set of SSBs are within a synchronization signal (SS) burst set.

22. A wireless node for wireless communication, comprising:
    a memory; and
    one or more processors, coupled to the memory, configured to:
       identify a first set of synchronization signal blocks (SSBs) used to indicate random access channel (RACH) occasions for a wireless access link and a second set of SSBs used to indicate RACH occasions for a wireless backhaul link, wherein the first set of SSBs and the second set of SSBs are mutually exclusive; and transmit a RACH message in a RACH occasion corresponding to an SSB index of an SSB included in the first set of SSBs.

23. The wireless node of claim 22, wherein the first set of SSBs is associated with a first RACH preamble format, and wherein the second set of SSBs is associated with a second RACH preamble format.

24. The wireless node of claim 22, wherein the first set of SSBs is identified based at least in part on a RACH configuration index that indicates RACH preamble formats.

25. The wireless node of claim 22, wherein the first set of SSBs is identified based at least in part on an indication from another wireless node.

26. The wireless node of claim 22, wherein the first set of SSBs and the second set of SSBs are within a synchronization signal (SS) burst set.

27. A wireless node for wireless communication, comprising:

a memory; and
one or more processors, coupled to the memory, configured to:
configure a first set of synchronization signal blocks (SSBs) to be used to indicate random access channel (RACH) occasions for a wireless access link and a second set of SSBs to be used to indicate RACH occasions for a wireless backhaul link, wherein the first set of SSBs and the second set of SSBs are mutually exclusive; and
transmit at least one of the first set of SSBs or the second set of SSBs.

28. The wireless node of claim 27, wherein the first set of SSBs is associated with a first RACH preamble format, and wherein the second set of SSBs is associated with a second RACH preamble format.

29. The wireless node of claim 27, wherein at least one of the first set of SSBs or the second set of SSBs is indicated to another wireless node.

30. The wireless node of claim 27, wherein the first set of SSBs and the second set of SSBs are within a synchronization signal (SS) burst set.

* * * * *